United States Patent [19]

Sweeney

[11] Patent Number: 4,489,757
[45] Date of Patent: Dec. 25, 1984

[54] ELECTRICALLY ACTUATED SERVOCONTROL SYSTEM FOR A STATIC PRESSURE OPERATED LOAD

[75] Inventor: William T. Sweeney, Ponca City, Okla.

[73] Assignee: Conoco Inc., Ponca City, Okla.

[21] Appl. No.: 99,950

[22] Filed: Dec. 3, 1979

Related U.S. Application Data

[63] Continuation of Ser. No. 865,086, Dec. 27, 1977, abandoned.

[51] Int. Cl.³ ............................................. F15B 13/043
[52] U.S. Cl. ........................................ 137/877; 91/52; 137/885
[58] Field of Search ...................... 91/52; 137/877, 885

[56] References Cited

U.S. PATENT DOCUMENTS

| | | | |
|---|---|---|---|
| 2,800,143 | 7/1957 | Keller | 91/52 X |
| 2,993,477 | 7/1961 | Panissidi | 91/52 X |
| 3,023,781 | 3/1962 | Larsen | 91/52 X |
| 3,245,424 | 4/1966 | Olsen | 91/52 X |
| 3,964,518 | 6/1976 | Hesse et al. | 137/625.64 |
| 4,066,103 | 1/1978 | Tandrup | 91/52 X |
| 4,114,650 | 9/1978 | Gordon | 91/52 X |
| 4,126,293 | 11/1978 | Zeuner et al. | 91/52 X |

Primary Examiner—Gerald A. Michalsky
Attorney, Agent, or Firm—William J. Miller

[57] ABSTRACT

An electrically actuated servocontrol system for a static pressure-operated load is connected to a supply of hydraulic fluid under pressure. The supply has an outlet port and a return port. A relief means is connected across the supply port for maintaining the supply at a constant pressure. A servocontrol valve has its inlet coupled to the outlet of the outlet port of the supply and its outlet coupled through a flow restrictor to the return sump of the power supply. The load is coupled between the output of the servocontrol valve and the flow restrictor. The flow restrictor also includes means for adjustably varying the amount of restriction so that the function of the servovalve can be made with linear variations in input control signals.

3 Claims, 3 Drawing Figures

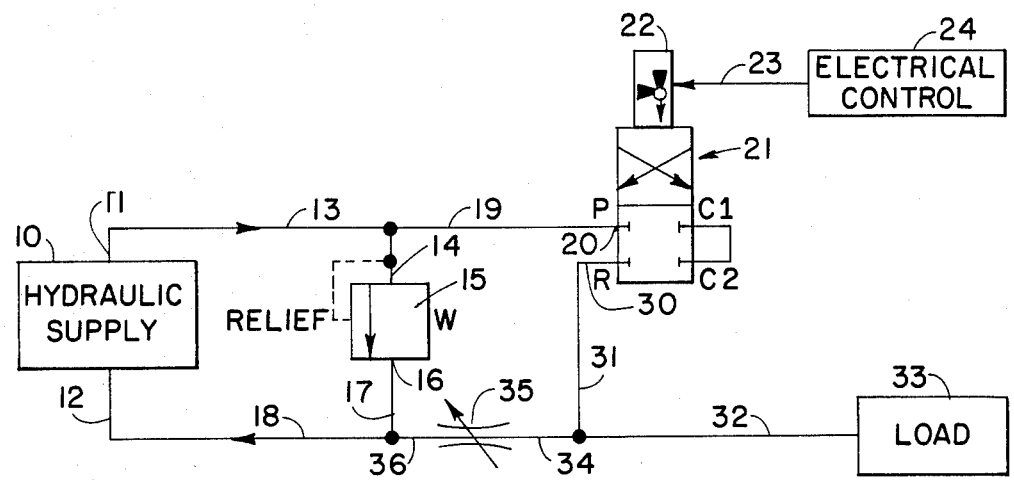
FIGURE I
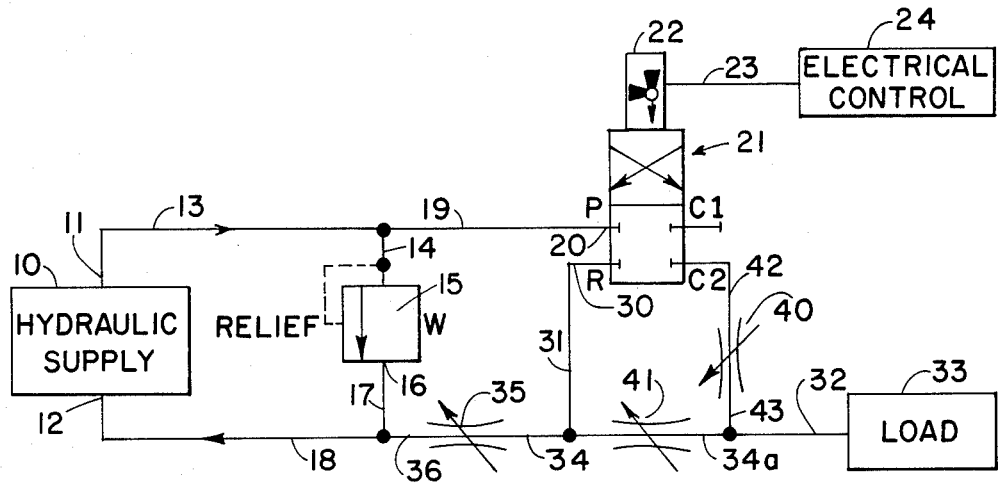
FIGURE II

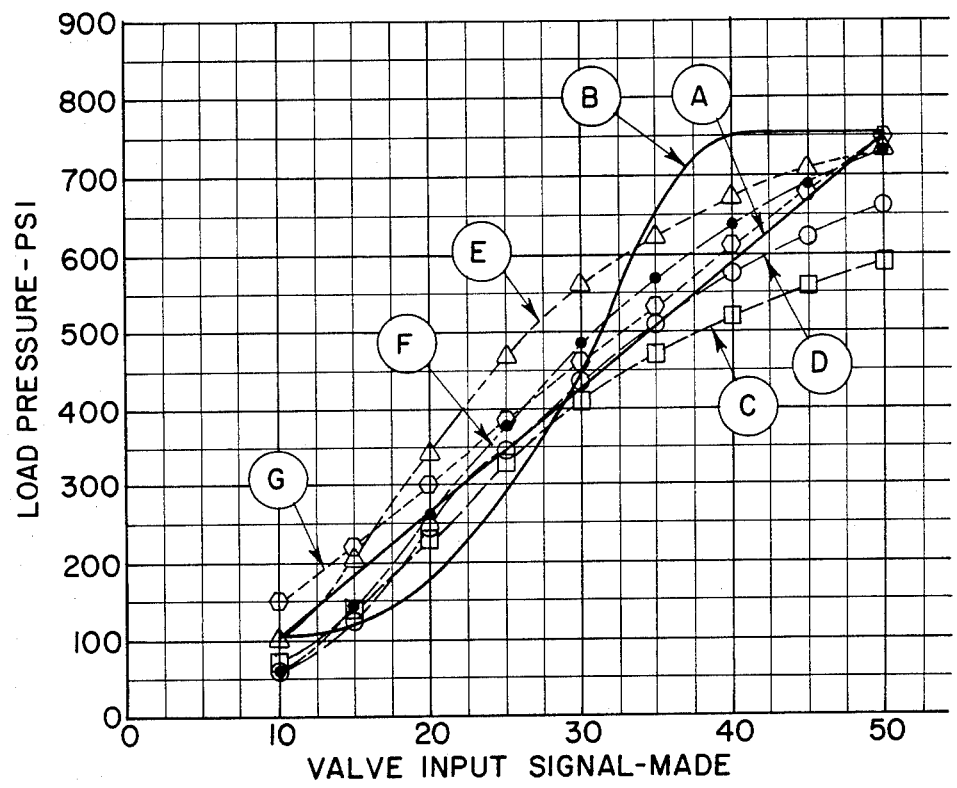
FIGURE III

ELECTRICALLY ACTUATED SERVOCONTROL SYSTEM FOR A STATIC PRESSURE OPERATED LOAD

This is a continuation of application Ser. No. 865,086, filed Dec. 27, 1977, now abandoned.

BACKGROUND OF THE INVENTION

One of the newer variable speed drives for coupling a motor to a load which, for example, may be a pump is an apparatus called a hydroviscous disc pack. The hydroviscous disc pack has an input shaft which terminates in a plurality of closely-spaced discs. The output shaft originates in a plurality of closely-spaced discs which are positioned between the input shaft discs. In between the discs is provided an oil film. The oil film generates the sheer as the discs rotate, the sheer transmitting a force to the output disc, causing the discs to rotate. The disc pack consists of alternate hardened steel and friction discs that are splined so they are free to slide axially, relative to each other. Torque transmitted through the pack on input to output shaft depends on how much clamping force is exerted by a piston assembly pneumatically or hydraulically actuated. The servocontrolled valve suitably connected operates the clamping piston to vary its pressure on the stack of discs, hence, the torque transmitted to the load. Such a disc pack is described in the journal titled *Product Engineering*, Dec. 15, 1969, on pages 102 through 104.

BRIEF DESCRIPTION OF THE INVENTION

One of the problems with the hydroviscous disc pack when used as a variable speed drive for operating a pump, for example, which in turn is coupled to a control system, has been making the transferred torque of the variable speed drive linear or functionally related in its output response to a signal applied to the input of the servocontrol system. This invention describes a method for providing a substantially linear output for a static pressure operated load by placing a relief means across the pressure and return ports of a hydraulic supply which will maintain the supply at a substantially constant pressure. The servocontrol valve has its hydraulic inlet connected to the pressure outlet of the hydraulic supply and its outlet connected through a variable flow restrictor which is coupled to the return port of the hydraulic supply. The static load is then coupled to the junction between the outlet of the servocontrolled valve and the variable flow restrictor.

The restrictor is adjusted so that under the flow conditions of the valve that a variable input signal to the servocontrol valve will produce a substantially linear response in pressure at the output of the servocontrol valve.

One feature of the invention is that it provides a simple electrical to mechanical control for a static pressure controlled device. No complex pressure control utilizing electronic programmable components are necessary, thereby substantially improving the reliability and serviceability of the control system during field use.

BRIEF DESCRIPTION OF THE FIGURES

FIG. 1 illustrates an electrically actuated static pressure control system having a variable restrictor inserted between the servocontrol valve and the return port to the hydraulic supply, and, FIG. 2 is a modification of the apparatus illustrated in FIG. 1 and includes additional placement of restrictors; and FIG. 3 is a graph showing the predictable responses from various settings of the restrictor or restrictors illustrated in FIGS. 1 and 2.

DETAILED DESCRIPTION OF THE INVENTION

Referring to all of the figures, but in particular to FIGS. 1 and 2, a hydraulic supply 10 has a pressured output outlet port 11 and a return or relief port 12 coupled through a hydraulic line 13 to the inlet 14 of a relief valve 15. The outlet port 16 of relief valve 15 is coupled through hydraulic lines 17 and 18 to the inlet or return port 12 of hydraulic supply 10. A hydraulic line 19 couples line 13 and inlet 14 to an inlet port 20 of a hydraulic servocontrol valve referred to by arrow 21. Hydraulic servocontrol valve 21 is of the usual type which has an electrical to a hydraulic control 22 and which must be a closed center type valve which is electrically coupled through a wire 23 to an electrical control system 24. Electrical control system 24 can either be a manually operated control system, or it can be an integral part of a servoloop from some other electrical control system that can be indirectly or directly coupled into the response of the load. Servocontrol valve 21 has an outlet port 30 coupled through a hydraulic pipe 31 and 32 to a static pressure load 33.

Hydraulic pipe 31 is also coupled to a pipe 34 to a variable or adjustable restrictor 35 which is in turn coupled to a hydraulic pipe 36 and to a hydraulic pipe 18 which is in turn coupled to the return port 12 of hydraulic supply 10.

OPERATION

The apparatus illustrated in FIG. 1 employs a constant pressure fluid supply operating through an electrically actuated flow control valve (such as a MOOG Series 62 closed center flow control servo valve). The flow is then routed through a primary restrictor and back to the reservoir for reuse.

Hydraulic supply 10 generate a specific flow through line 13, a predetermined amount of flow is passed through lines 14 and 17 by operation of relief valve 15 causing a certain pressure at inlet 14 of relief valve 15 depending upon the setting of relief valve 15. This pressure creates a flow (when servo valve 21 is open) through pipe 19, hydraulic control valve 21 through pipes 31, 34, restrictor 35, pipes 36 and 18 back to the hydraulic supply. The flow is controlled by the servohydraulically controlled valve 21 and by restrictor 35. The flow, of course, is also determined by the pressure setting generated by the hydraulic supply and as limited by the relief control valve 15. Thus, for a certain pressure across relief valve 15, a particular flow will flow through the system as determined by the electrically controlled servovalve 21 and restrictor 35. In order to set the flow, servocontrol valve 21 is opened for maximum flow and restrictor 35 is adjusted for the flow desired.

In Table 1 set out below, various curves are generated in response to a linear electrical input from control system 24 to control valve 22. Each of the curves has a certain pressure across the supply as determined by the setting of relief valve 15 and maximum flow rate in gallons per minute as determined by the full open setting of servocontrol valve 21 and as restricted by the setting of restrictor 35.

TABLE I

BASIS FOR PLOTS SHOWN IN FIG. 3

| PLOT REF. | NOMINAL SUPPLY PRES. (PSI) | MAXIMUM FLOWRATE (GPM) |
|---|---|---|
| A | TARGET CURVE | |
| B | TYPICAL RESPONSE OF "PURCHASED SYSTEM" | |
| C | 750 | 1.13 |
| D | 850 | 1.30 |
| E | 850 | 1.02 |
| F | 900 | 1.20 |
| G | 1490 | 2.51 |

It can be seen in referring, for example, to curve C that for a pressure of 750 pounds at relief valve inlet 14 and with the maximum flow rate of 1.13 gallons per minute that the response of valve input signal versus load pressure fell substantially below the desired response shown by line A which represents a desired linear response. If the pressure across relief valve 15 is changed, for example, to curve G, it can be seen that at 1,490 pounds and 2.51 gallons per minute, a nearly linear response is obtained with a variation in valve input signal versus load pressure.

It is obvious that if a linear response is not desired that the load pressure and relief setting can be changed to obtain the desired response within the limits of the system.

Referring to FIG. 2, additional restrictors 40 and 41 are added to the hydraulic circuitry. Restrictor 40 is coupled from the servocontrol valve 21 through pipe 42 and 43 to hydraulic pipe 32 which is connected in turn to load 33 and conduit 34A which, in turn, is connected to a restrictor 41.

The operation of this hydraulic circuit is similar to that of FIG. 1. The primary difference being the additional possible variation in pressure to load 33 and flow controls through additional restrictors 40, 41, and 35. It is obvious, of course, that with restrictors 40 and 41, the pressure at load 33 will be reduced over the pressure at load 33 shown in FIG. 1. For example, if restrictors 40 and 41 are of the same size, then the pressure at load 33 will be approximately half that shown in FIG. 1. The actual pressure, of course, will be determined by the total flow restriction provided by all three restrictors 40, 41, and 35. If the restriction of restrictor 35 is substantially smaller than the restriction of restrictors 40 and 41, then the pressure at load 33 will be approximately ½ that shown in FIG. 1. If, however, the restriction of restrictor 35 is equal to or larger than the restriction provided by restrictors 40 and 41, then the pressure at load 33 in FIG. 2 will be substantially higher. It is obvious that with the combination shown in FIG. 2, additional variations in the valve input signal versus load pressure curves illustrated, for example, in FIG. 3 can be varied: thus, other desirable curves can be attained by proper adjustment of the flow through each of the restrictors and the pressure at relief valve input 14.

CONCLUSIONS

An improved servohydraulically controlled static pressure system has been disclosed which provides a desired valve input signal versus load pressure characteristic. The valve input signal versus load pressure characteristic can be made linear if desired, or it can be made nonlinear if the output system requires a nonlinear response. Thus, an extremely flexible system has been disclosed for providing a hydraulic control to a load such as a hydroviscous disc pack drive, for example. The particular description of the operation in conjunction with a disc pack device is included by way of example only. The invention can obviously be used on any device where a constant pressure source is required and the invention is not so limited to the particularly described example. It is obvious that other combinations of restrictors can be utilized in conjunction with a variable pressure supply, for example, and still be well within the spirit and scope of this invention as set out in the following appended claims and as described in the specification.

What I claim is:

1. An electrically actuated servo control system for a load which requires a predictable variation in hydraulic pressure with minimal flow of hydraulic fluid comprising:
   (a) a supply of hydraulic fluid under pressure, said supply having an outlet port and a return port;
   (b) a load connection port means;
   (c) relief means connected across said supply outlet and return ports for maintaining said supply at a constant pressure;
   (d) servo control valve means having inlet and outlet hydraulic ports, and an electrical control means coupled to said servo control valve means;
   (e) means for coupling the outlet port of said supply to the inlet port of said servo control valve means;
   (f) flow restriction means comprising first and second flow restriction means serially connected coupling the outlet port of said servo control valve means to said supply return port; and
   (g) a single hydraulic pipe for coupling said servo control valve means outlet port to said load connection port means between said first and second flow restriction means whereby the hydraulic pressure at said load connection means varies predictably with the control output to said servo control valve means without requiring but minimal flow of hydraulic fluid.

2. An apparatus as described in claim 1 wherein said restriction means is adjustable.

3. An apparatus as described in claim 1 wherein each of said 1st and 2nd flow restriction means is adjustable.

* * * * *